(12) United States Patent
Lin et al.

(10) Patent No.: US 10,132,516 B2
(45) Date of Patent: Nov. 20, 2018

(54) CONTROL METHOD FOR AIR DEFLECTORS OF AIR CONDITIONER

(71) Applicant: Gree Electric Appliances, Inc. of Zhuhai, Zhuhai (CN)

(72) Inventors: Weixue Lin, Zhuhai (CN); Zebo Chen, Zhuhai (CN); Wenqi Kuang, Zhuhai (CN); Cheng Wang, Zhuhai (CN); Yaobiao Yue, Zhuhai (CN)

(73) Assignee: GREE ELECTRIC APPLIANCES, INF OF ZHUHAI, Zhuhai (CN)

( * ) Notice: Subject to any disclaimer, the term of this patent is extended or adjusted under 35 U.S.C. 154(b) by 370 days.

(21) Appl. No.: 14/958,799

(22) Filed: Dec. 3, 2015

(65) Prior Publication Data
US 2016/0084516 A1 Mar. 24, 2016

Related U.S. Application Data

(63) Continuation of application No. PCT/CN2013/089846, filed on Dec. 18, 2013.

(30) Foreign Application Priority Data

Jun. 4, 2013 (CN) .......................... 2013 1 0220128

(51) Int. Cl.
*F24F 11/00* (2018.01)
*F24F 13/10* (2006.01)
(Continued)

(52) U.S. Cl.
CPC .......... *F24F 11/0012* (2013.01); *F24F 11/30* (2018.01); *F24F 11/79* (2018.01);
(Continued)

(58) Field of Classification Search
CPC ............... F24F 13/10; F24F 2011/0056; F24F 2013/207
(Continued)

(56) References Cited

U.S. PATENT DOCUMENTS 5,193,742 A * 3/1993 Byun ................. G05D 23/1917
236/49.3
5,251,814 A * 10/1993 Warashina ............ F24F 1/0007
236/49.3
(Continued)

FOREIGN PATENT DOCUMENTS

CN 202048627 U 11/2011
CN 202928035 U 5/2013
(Continued)

OTHER PUBLICATIONS

International Search Report dated Mar. 20, 2014 for PCT/CN2013/089846, 6 pages.

*Primary Examiner* — Henry Crenshaw
(74) *Attorney, Agent, or Firm* — Franklin & Associates International Inc; Matthew Lambrinos

(57) ABSTRACT

Disclosed is a control method for air deflectors of an air conditioner. The air deflectors are arranged at an air outlet of the air conditioner to adjust directions of discharged air. The control method comprises: during the air conditioner is operating in a refrigeration mode, judging whether a motion instruction for swinging air is input or not; when the motion instruction for swinging air is not input, acquiring a set air volume level, set temperature T1 and indoor ambient temperature T2; according to the set air volume level, the set temperature T1 and the indoor ambient temperature T2, judging the amount of a refrigeration demand of a user; and according to the amount of the refrigeration demand of the user, controlling an air guide angle of the air deflectors.

12 Claims, 3 Drawing Sheets

(51) Int. Cl.
*F24F 11/30* (2018.01)
*F24F 11/79* (2018.01)
*F24F 13/20* (2006.01)
*F24F 110/10* (2018.01)

(52) U.S. Cl.
CPC ........ *F24F 13/10* (2013.01); *F24F 2013/207* (2013.01); *F24F 2110/10* (2018.01)

(58) Field of Classification Search
USPC .......................................................... 62/186
See application file for complete search history.

(56) References Cited

U.S. PATENT DOCUMENTS

| | | | | |
|---|---|---|---|---|
| 5,499,508 | A * | 3/1996 | Arai | F25B 9/006 62/114 |
| 5,642,628 | A * | 7/1997 | Whipple, III | F24F 11/0076 165/294 |
| 5,815,078 | A * | 9/1998 | Mun | F24F 11/79 340/573.1 |
| 6,378,317 | B1 * | 4/2002 | Ribo | F24F 3/00 62/186 |
| 6,841,749 | B1 * | 1/2005 | Radosavljevic | H01H 15/06 200/550 |
| 2004/0211553 | A1 * | 10/2004 | Hancock | F24F 1/0007 165/260 |
| 2004/0244391 | A1 * | 12/2004 | Kouno | F24F 1/0011 62/176.1 |
| 2006/0048525 | A1 * | 3/2006 | Cook | F24F 13/1426 62/131 |
| 2006/0201174 | A1 * | 9/2006 | Marshall | B60H 1/00678 62/186 |
| 2012/0164930 | A1 * | 6/2012 | Murayama | H05K 7/20745 454/184 |
| 2016/0084516 | A1 * | 3/2016 | Lin | F24F 11/0078 454/258 |

FOREIGN PATENT DOCUMENTS

| | | |
|---|---|---|
| CN | 202947279 U | 5/2013 |
| JP | S6457037 A | 3/1989 |
| JP | H11141897 A | 5/1999 |
| JP | 2001248888 A | 9/2001 |
| WO | 2014194645 A1 | 12/2014 |

* cited by examiner

CONTROL METHOD FOR AIR DEFLECTORS OF AIR CONDITIONER

CROSS REFERENCE TO RELATED APPLICATIONS

This application is a continuation application of PCT Patent Application No. PCT/CN2013/089846, entitled "Control Method for Air Deflectors of Air Conditioner", filed on Dec. 18, 2013, which claims priority to Chinese Patent Application No. 201310220128.4, entitled "Control Method for Air Deflectors of Air Conditioner", filed on Jun. 4, 2013, the entire contents of which are incorporated herein by reference.

TECHNICAL FIELD

The present disclosure relates to an air conditioner, more particularly, to a control method for air deflectors of an air conditioner.

BACKGROUND

As shown in FIG. 1, the indoor unit 100 of a pipe-ventilated air conditioner in the prior art comprises an indoor unit body 110, and an air outlet component 120 arranged at the air outlet of the indoor unit body. Wherein, the air outlet component 120 comprises an air outlet frame 121, air deflectors 122 for guiding the directions of the air discharged from the air conditioner, and a driving device (not shown) for driving the air deflectors to rotate. In the prior art, the control method for the air deflectors is as follows: when the air conditioner is running, according to the air volume levels, the temperature and so on, which are input by the user, the controller determines the air guide angle of the air deflectors, and sends control signals to the driving device of the air deflectors, and the driving device drives the air deflectors to rotate to a required air guide angle. The problem of this control method is that, when the air conditioner is running, if the user does not adjust the air guide angle of the air deflectors, the air deflectors will remain the default angle all the time and will not be adjusted automatically according to the environment, thereby causing poor comfort.

SUMMARY OF THE INVENTION

In view of the situations in the prior art, the objective of the present disclosure is to provide a control method for air deflectors of an air conditioner, which can automatically control the air guide angle of the air deflectors according to the demand of a user, so as to improve the comfort of the air conditioner.

The present disclosure provides a control method for air deflectors of an air conditioner. The air deflectors are arranged at the air outlet of the air conditioner and configured to adjust the direction of the discharged air. The control method comprises following steps:

during the air conditioner is running in a refrigeration mode, judging whether a motion instruction for swinging air is input or not;

when the motion instruction for swinging air is not input, acquiring a set air volume level, set temperature $T1$ and indoor ambient temperature $T2$;

judging amount of refrigeration demand of a user according to the set air volume level, the set temperature $T1$ and the indoor ambient temperature $T2$; and controlling an air guide angle of the air deflectors according to the amount of the refrigeration demand of the user.

In one of the embodiments, the step of judging the amount of the refrigeration demand of the user comprises:

judging whether the set air volume level is higher than a medium air volume level or not;

judging whether $T2$ is equal to or greater than $T1+t$; wherein, $1° C. \leq t \leq 3° C.$;

if the set air volume level is higher than the medium air volume level, and $T2 \geq T1+t$, it is judged that the refrigeration demand of the user is large; otherwise, it is judged that the refrigeration demand of the user is small.

In one of the embodiments, an indoor fan of the air conditioner has options for air volume level, including a super-high air volume level, a high air volume level, the medium air volume level and a low air volume level; and the step of judging the amount of the refrigeration demand of the user comprises:

step a: judging whether the set air volume level is the super-high air volume level or not;

step b: if the set air volume level is the super-high air volume level, further judging whether $T2$ is equal to or greater than $T1+t$ or not; if $T2$ is equal to or greater than $T1+t$, it is judged that the refrigeration demand of the user is large; if $T2$ is less than $T1+t$, it is judged that the refrigeration demand of the user is small;

step c: if the set air volume level is not the super-high air volume level, judging whether the set air volume level is the high air volume level or not;

step d: if the set air volume level is the high air volume level, further judging whether $T2$ is equal to or greater than $T1+t$; if $T2$ is equal to or greater than $T1+t$, it is judged that the refrigeration demand of the user is large; if $T2$ is less than $T1+t$, it is judged that the refrigeration demand of the user is small; and if the set air volume level is neither the super-high air volume level nor the high air volume level, it is judged that the refrigeration demand of the user is small.

In one of the embodiments, the step of controlling the air guide angle of the air deflectors according to the amount of the refrigeration demand of the user comprises:

when the set air volume level is the super-high air volume level, and $T2$ is equal to or greater than $T1+t$, it is judged that the refrigeration demand of the user is large, and the air guide angle is adjusted to $a0$;

when the set air volume level is the super-high air volume level, $T2$ is less than $T1+t$, and it is judged that the refrigeration demand of the user is small, the air guide angle is adjusted to $a1$;

when the set air volume level is the high air volume level, $T2$ is equal to or greater than $T1+t$, and it is judged that the refrigeration demand of the user is large, the air guide angle is adjusted to $a2$;

when the set air volume level is the high air volume level, $T2$ is less than $T1+t$, and it is judged that the refrigeration demand of the user is small, the air guide angle is adjusted to $a3$;

when the set air volume level is neither the super-high air volume level nor the high air volume level, and it is judged that the refrigeration demand of the user is small, the air guide angle is adjusted to $a4$;

wherein, $a0=a2>a1>a3>a4$.

In one of the embodiments, $a0=a2=90°$.
In one of the embodiments, $20° \leq a1 < 90°$.
In one of the embodiments, $25° \leq a3 < 90°$.
In one of the embodiments, $30° \leq a4 < 90°$.

In one of the embodiments, the air deflectors are retractable along the direction of the air discharged from the air outlet, and the control method comprises following steps:

detecting the air guide angle of the air deflectors;

comparing the detected air guide angle α with a set air guide angle α';

if a≥a', driving the air deflectors to extend outwards from an initial position for a stroke of X1;

if a<a', driving the air deflectors to extend outwards from an initial position for a stroke of X2;

wherein, X1<X2.

In one of the embodiments, 40°≤a'≤50°.

In one of the embodiments, 0 mm≤X1≤20 mm.

In one of the embodiments, 20 mm≤X2≤40 mm.

In one of the embodiments, the air conditioner is a pipe-ventilated air conditioner; and air is discharged downwards from the air outlet.

As compared with the control method in the prior art, the control method for air deflectors of an air conditioner of the present disclosure judges the amount of the refrigeration demand of the user more accurately according to three conditions, namely, the set air volume level, the set temperature and the indoor ambient temperature, and controls the air guide angle of the air deflectors according to the demand of the user, thereby realizing more user-friendly and more comfortable air supply control.

Additionally, the control method of the present disclosure controls the extension stroke of the air deflectors according to the air guide angle, which makes air discharged more smoothly, prevents the cold air current from clinging to and cooling the suspended ceiling, and avoids condensation formed on the suspended ceiling.

BRIEF DESCRIPTION OF THE DRAWINGS

FIG. 3 and FIG. 4 are flow charts illustrating the control method for air deflectors of an air conditioner according to one embodiment of the present invention; wherein, FIG. 3 is a flow chart for controlling the air guide angle of the air deflectors, and FIG. 4 is a flow chart for controlling the extension stroke of the air deflectors.

DETAILED DESCRIPTION OF THE PREFERRED EMBODIMENTS

The present disclosure will be described in more details with reference to the accompanying figures and embodiments. It should be noted that various embodiments and the features thereof can be combined with each other under the condition of no conflict.

Figure 1:
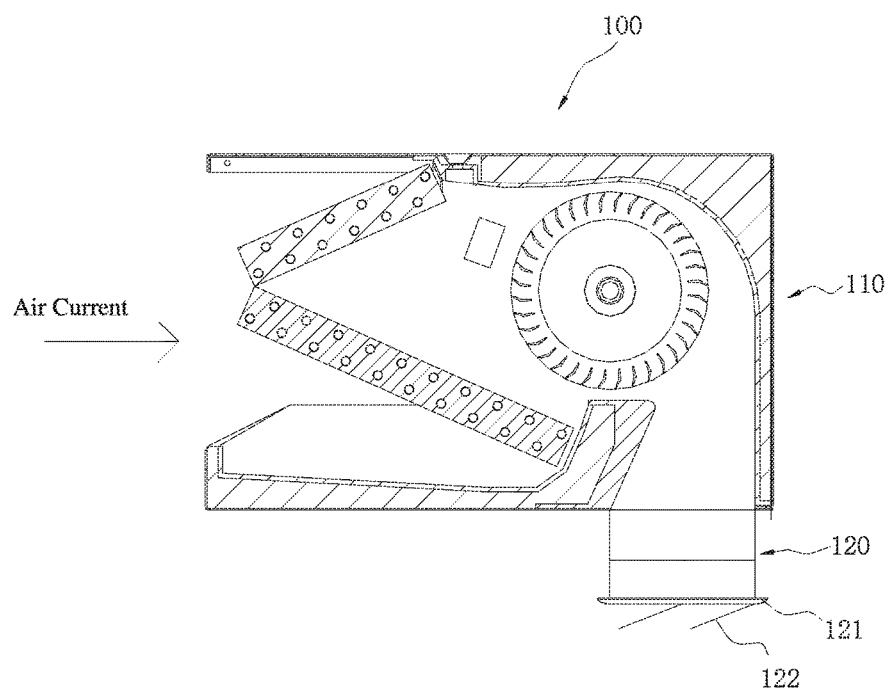
FIG. 1 is a structural schematic diagram of the indoor unit of an air conditioner in the prior art.
Figure 2:
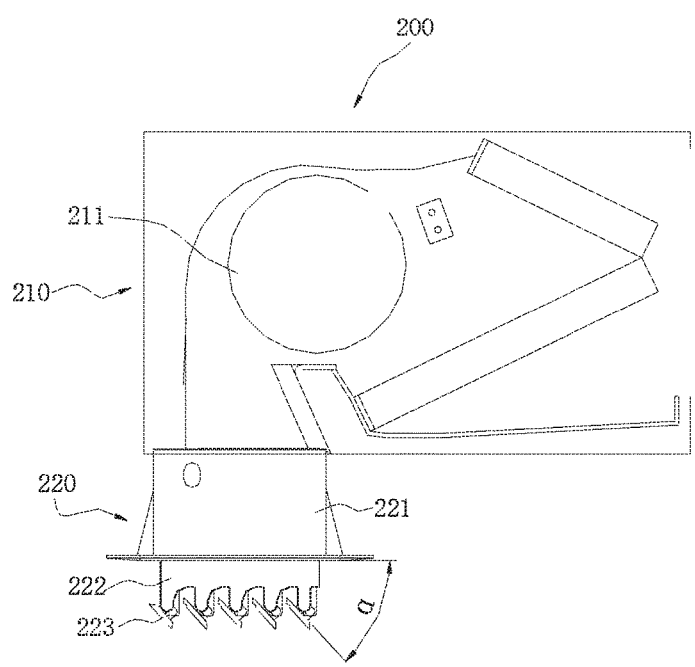
FIG. 2 is a structural schematic diagram of the indoor unit of an air conditioner according to one embodiment of the present invention.

FIG. 2 is a structural schematic diagram of the indoor unit of an air conditioner according to one embodiment of the present invention. In this embodiment, the air conditioner is a pipe-ventilated air conditioner, the indoor unit 200 comprises an indoor unit body 210 and an air outlet component 220 arranged at the air outlet of the indoor unit body 210. Wherein, an indoor fan 211 is provided inside the indoor unit body 210. In this embodiment, the indoor fan 211 has four options for the air volume level, i.e., a super-high air volume level, a high air volume level, a medium air volume level and a low air volume level, so as to realize more precise control for the rotation speed of the fan. The air outlet component 220 comprises an outer air outlet frame 221, an inner air outlet frame 222 arranged inside the outer air outlet frame 221, multiple air deflectors 223 arranged on the inner air outlet frame 222, and a first driving device (not shown) for driving the air deflectors 223 to rotate around shafts. The first driving device comprises a stepper motor and a gear drive mechanism. As shown in FIG. 2, an air guide angle α is formed between the panel surface of the outer air outlet frame 221 and the windward side of the air deflectors 223.

Figure 3:
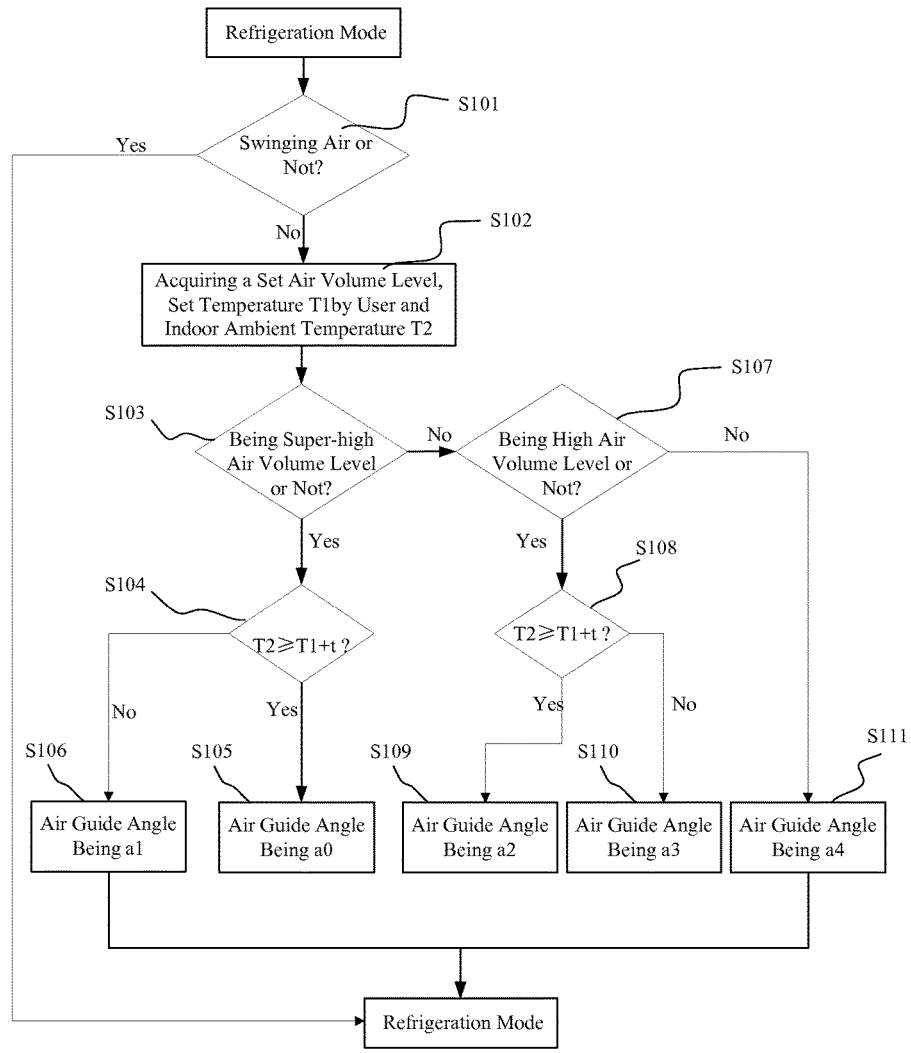

FIG. 3 is a flow chart of a control method for the air deflectors 223 of the air conditioner. The control method comprises steps as follows.

Step S101: during the air conditioner is running in a refrigeration mode, a controller judges whether a motion instruction for swinging air is input or not.

Step S102: when the motion instruction for swinging air is not input, the controller acquires an air volume level and temperature T1 set by a user from a memorizer, and acquires the indoor ambient temperature T2.

The controller judges the amount of the refrigeration demand of the user according to the set air volume level, the set temperature T1 and the indoor ambient temperature T2, and controls the air guide angle α of the air deflectors according to the amount of the refrigeration demand of the user. The specific steps are as follows.

Step S103: the controller judges whether the set air volume level is the super-high air volume level or not.

Step S104: when the set air volume level is the super-high air volume level, the controller judges whether T2 is equal to or greater than T1+t;

Step S105: if T2≥T1+t, it is judged that the refrigeration demand of the user is large; the controller sends a control signal to the first driving device, and the first driving device drives the air deflectors 223 to rotate, making the air guide angle α become a0; preferably, a0 is equal to 90°, so as to refrigerate quickly;

Step S106: if T2<T1+t, it is judged that the refrigeration demand of the user is small, the controller sends a control signal to the first driving device, and the first driving device drives the air deflectors 223 to rotate, making the air guide angle α become a1; preferably, 20°≤a1<90°, and further, a1 is equal to 20°;

Step S107: when the set air volume level is not the super-high air volume level, the controller judges whether the set air volume level is the high air volume level or not;

Step S108: when the set air volume level is the high air volume level, the controller judges whether T2 is equal to or greater than T1+t;

Step S109: if T2≥T1+t, it is judged that the refrigeration demand of the user is large, the controller sends a control signal to the first driving device, and the first driving device drives the air deflectors 223 to rotate, making the air guide angle α become a2; preferably, a2 is equal to 90°, so as to refrigerate quickly;

Step S110: if T2<T1+t, it is judged that the refrigeration demand of the user is small, the controller sends a control signal to the first driving device, and the first driving device drives the air deflectors 223 to rotate, making the air guide angle α become a3; preferably, 25°≤a3<90°, and further, a3 is equal to 25°;

Step S111: when the set air volume level is not the high air volume level, it is judged that the refrigeration demand of the user is small, the controller sends a control signal to the first driving device, and the first drives device drives the air deflectors 223 to rotate, making the air guide angle α become a4; preferably, 30°≤a4<90°, and further, a4 is equal to 30°.

When a motion instruction for swinging air is received during the above control process, the air conditioner exists from the control process and performs the instruction received.

The value of t is determined according to the control precision. In this embodiment, 1° C.≤t≤3° C. Further, t is equal to 1° C., so as to realize more precise control and make the user feel more comfortable.

Figure 4:
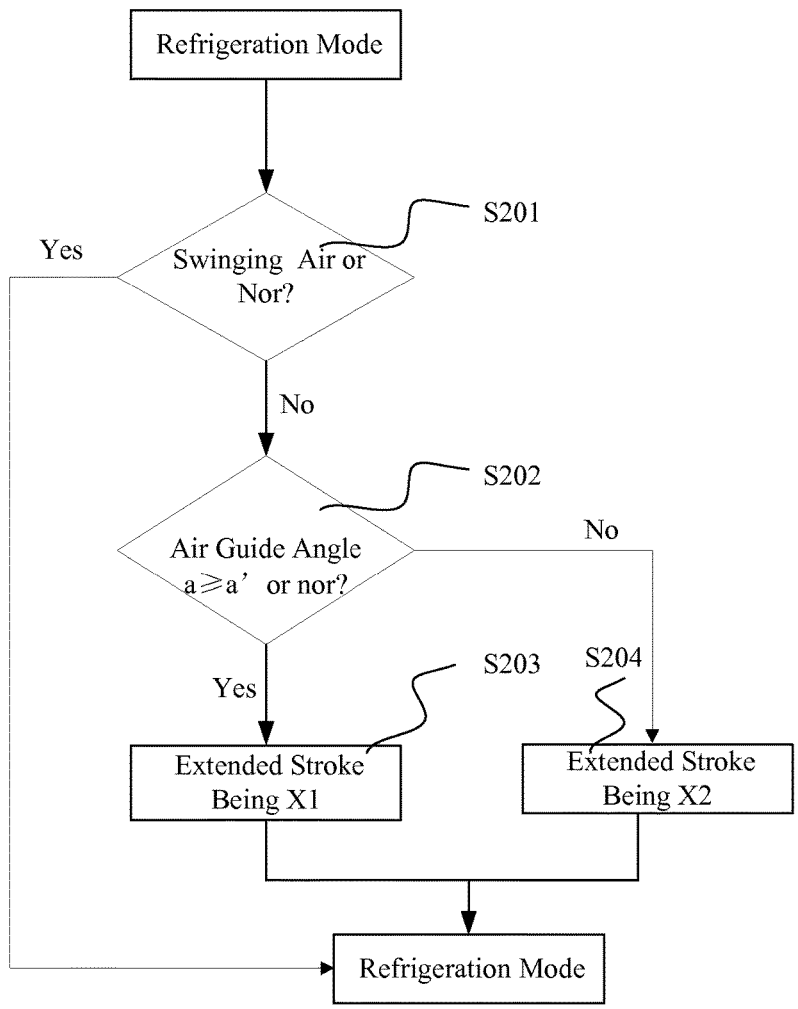

Additionally, when the air guide angle is smaller, the resistance to the air discharged will be larger; moreover, if the air guide angle is too small, the cold air current will cling to and cool the suspended ceiling, and condensation is apt to be formed on the suspended ceiling after the air conditioner stops running. In order to solve this problem, the inner air outlet frame 222 is retractably disposed inside the outer air outlet frame 221. The air outlet component 220 further comprises a second driving device for driving fore and aft motion of the inner air outlet frame 222. The second driving device comprises a stepper motor (not shown) and a gear and rack drive mechanism (not shown). As shown in FIG. 4, the control method of the present disclosure further comprises following steps:

step S201. when the air conditioner is running in refrigeration mode, judging by the controller whether a motion instruction for swinging air is input or not;

step S202. when the motion instruction for swinging air is not input, acquiring, by the controller, the air guide angle α detected with a position sensor;

step S203. comparing the air guide angle α with a set air guide angle α', preferably, 40°≤α'≤50°;

step S204. if a≥a', driving the air deflectors 223 to extend outwards from the initial position for a stroke of X1; preferably, 0 mm≤X1≤20 mm, and further, X1 is equal to 10 mm or 20 mm;

step S205. if a<a', driving the air deflectors 223 to extend outwards from the initial position for a stroke of X2; preferably, 20 mm≤X2≤40 mm, and further, X1 is equal to 30 mm or 40 mm.

When a motion instruction for swinging air is received during the above control process, the air conditioner exists from the control process, and the air deflectors return to the initial position and state when the motion of swing air is not performed.

The control method of the present disclosure can control the stroke of the air deflectors 223 according to the air guide angle as well, therefore, when the air guide angle is smaller, the extension stroke is longer, conversely, the extension stroke is shorter, which makes air discharged more smoothly, prevents the cold air current from clinging to and cooling the suspended ceiling, and avoids condensation formed on the suspended ceiling.

What described above are several embodiments of the present invention, and they are specific and in details, but not intended to limit the scope of the present invention. It will be understood by those skilled in the prior art that various modifications and improvements can be made without departing from the spirit of the present invention. All of these modifications and improvements fall within the scope of the present invention.

What is claimed is:

1. A control method for air deflectors of an air conditioner, wherein, the air deflectors are arranged at an air outlet of the air conditioner and configured to adjust a direction of discharged air, and are retractable along the direction of the air discharged from the air outlet, the control method comprises following steps:

during the air conditioner is running in a refrigeration mode, judging whether a motion instruction for swinging air is input or not;

when the motion instruction for swinging air is not input, acquiring a set air volume level, set temperature T1 and indoor ambient temperature T2;

judging amount of refrigeration demand of a user according to the set air volume level, the set temperature T1 and the indoor ambient temperature T2; and controlling an air guide angle of the air deflectors according to the amount of the refrigeration demand of the user;

detecting the air guide angle of the air deflectors;

comparing the detected air guide angle α with a set air guide angle α';

if a≥a', driving the air deflectors to extend outwards from an initial position for a stroke of X1;

if a<a', driving the air deflectors to extend outwards from an initial position for a stroke of X2;

wherein, X1<X2.

2. The control method for air deflectors of an air conditioner according to claim 1, wherein, the step of judging amount of refrigeration demand of a user comprises:

judging whether the set air volume level is higher than a medium air volume level or not;

judging whether T2 is equal to or greater than T1+t, wherein, 1° C.≤t≤3° C.;

if the set air volume level is higher than the medium air volume level, and T2≥T1+t, it is judged that the refrigeration demand of the user is large;

otherwise, it is judged that the refrigeration demand of the user is small.

3. The control method for air deflectors of an air conditioner according to claim 2, wherein, an indoor fan of the air conditioner has options for air volume level, including a super-high air volume level, a high air volume level, the medium air volume level and a low air volume level; and the step of judging amount of refrigeration demand of a user comprises:

step a: judging whether the set air volume level is the super-high air volume level or not;

step b: if the set air volume level is the super-high air volume level, further judging whether T2 is equal to or greater than T1+t or not; if T2 is equal to or greater than T1+t, it is judged that the refrigeration demand of the user is large; if T2 is less than T1+t, it is judged that the refrigeration demand of the user is small;

step c: if the set air volume level is not the super-high air volume level, judging whether the set air volume level is the high air volume level or not;

step d: if the set air volume level is the high air volume level, further judging whether T2 is equal to or greater than T1+t; if T2 is equal to or greater than T1+t, it is judged that the refrigeration demand of the user is large; if T2 is less than T1+t, it is judged that the refrigeration demand of the user is small; and if the set air volume level is neither the super-high air volume level nor the high air volume level, it is judged that the refrigeration demand of the user is small.

4. The control method for air deflectors of an air conditioner according to claim 3, wherein, the step of controlling an air guide angle of the air deflectors according to the amount of the refrigeration demand of the user comprises:

when the set air volume level is the super-high air volume level, T2 is equal to or greater than T1+t, and it is judged that the refrigeration demand of the user is large, the air guide angle is adjusted to a0;

when the set air volume level is the super-high air volume level, T2 is less than T1+t, and it is judged that the refrigeration demand of the user is small, the air guide angle is adjusted to a1;

when the set air volume level is the high air volume level, T2 is equal to or greater than T1+t, and it is judged that the refrigeration demand of the user is large, the air guide angle is adjusted to a2;

when the set air volume level is the high air volume level, T2 is less than T1+t, and it is judged that the refrigeration demand of the user is small, the air guide angle is adjusted to a3;

when the set air volume level is neither the super-high air volume level nor the high air volume level, and it is judged that the refrigeration demand of the user is small, the air guide angle is adjusted to a4;

wherein, a0=a2>a1>a3>a4.

5. The control method for air deflectors of an air conditioner according to claim 4, wherein, a0=a2=90°.

6. The control method for air deflectors of an air conditioner according to claim 4, wherein, 20°≤a1<90°.

7. The control method for air deflectors of an air conditioner according to claim 4, wherein, 25°≤a3<90°.

8. The control method for air deflectors of an air conditioner according to claim 4, wherein, 30°≤a4<90°.

9. The control method for air deflectors of an air conditioner according to claim 1, wherein, 40°≤a'≤50°.

10. The control method for air deflectors of an air conditioner according to claim 1, wherein, 0 mm≤X1≤20 mm.

11. The control method for air deflectors of an air conditioner according to claim 1, wherein, 20 mm≤X2≤40 mm.

12. The control method for air deflectors of an air conditioner according to claim 1, wherein, the air conditioner is a pipe-ventilated air conditioner; and air is discharged downwards from the air outlet.

* * * * *

UNITED STATES PATENT AND TRADEMARK OFFICE
CERTIFICATE OF CORRECTION

PATENT NO. : 10,132,516 B2  
APPLICATION NO. : 14/958799  
DATED : November 20, 2018  
INVENTOR(S) : Weixue Lin et al.

Page 1 of 1

It is certified that error appears in the above-identified patent and that said Letters Patent is hereby corrected as shown below:

On the Title Page  
Item [73], replace "GREE ELECTRIC APPLIANCES, INF OF ZHUAHI, Zhuhai (CN)i" with --"GREE ELECTRIC APPLIANCES, INC OF ZHUAHI, Zhuhai (CN)i"--

Signed and Sealed this  
Twenty-sixth Day of November, 2019

Andrei Iancu  
*Director of the United States Patent and Trademark Office*